(12) United States Patent
Shi (10) Patent No.: US 8,514,911 B2
(45) Date of Patent: Aug. 20, 2013

(54) METHOD AND APPARATUS FOR CLOCK DRIFT COMPENSATION DURING ACQUISITION IN A WIRELESS COMMUNICATION SYSTEM

(75) Inventor: Jun Shi, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 455 days.

(21) Appl. No.: 12/465,559

(22) Filed: May 13, 2009

(65) Prior Publication Data
US 2010/0290573 A1 Nov. 18, 2010

(51) Int. Cl.
*H04B 1/707* (2011.01)

(52) U.S. Cl.
USPC .......................................................... 375/149

(58) Field of Classification Search
USPC ................. 375/149, 130, 140, 147, 150, 259, 375/260
See application file for complete search history.

(56) References Cited

U.S. PATENT DOCUMENTS

| | | | |
|---|---|---|---|
| 5,687,169 A | 11/1997 | Fullerton | |
| 5,764,696 A | 6/1998 | Barnes et al. | |
| 5,812,081 A | 9/1998 | Fullerton | |
| 5,832,035 A | 11/1998 | Fullerton | |
| 5,907,427 A | 5/1999 | Scalora et al. | |
| 5,952,956 A | 9/1999 | Fullerton | |
| 5,960,031 A | 9/1999 | Fullerton et al. | |
| 5,963,581 A | 10/1999 | Fullerton et al. | |
| 5,969,663 A | 10/1999 | Fullerton et al. | |
| 5,995,534 A | 11/1999 | Fullerton et al. | |
| 6,031,862 A | 2/2000 | Fullerton et al. | |
| 6,091,374 A | 7/2000 | Barnes | |
| 6,111,536 A | 8/2000 | Richards et al. | |
| 6,133,876 A | 10/2000 | Fullerton et al. | |
| 6,177,903 B1 | 1/2001 | Fullerton et al. | |
| 6,218,979 B1 | 4/2001 | Barnes et al. | |
| 6,295,019 B1 | 9/2001 | Richards et al. | |
| 6,297,773 B1 | 10/2001 | Fullerton et al. | |
| 6,300,903 B1 | 10/2001 | Richards et al. | |
| 6,304,623 B1 | 10/2001 | Richards et al. | |
| 6,351,652 B1 | 2/2002 | Finn et al. | |
| 6,354,946 B1 | 3/2002 | Finn | |
| 6,400,307 B2 | 6/2002 | Fullerton et al. | |
| 6,400,329 B1 | 6/2002 | Barnes | |
| 6,421,389 B1 | 7/2002 | Jett et al. | |
| 6,430,208 B1 | 8/2002 | Fullerton et al. | |
| 6,437,756 B1 | 8/2002 | Schantz | |
| 6,462,701 B1 | 10/2002 | Finn | |
| 6,466,125 B1 | 10/2002 | Richards et al. | |

(Continued)

OTHER PUBLICATIONS

Yuanjin Zheng et al: "A New Synchronization Algorithm for UWB Impulse Radio Communication Systems". Communication Systems, 2004, ICCS 2004. The Ninth International Conference on Singapore, China Sep. 6-8, 2004, Piscataway, NJ. LNKD-DOI; 10.1109/ICCS. 2004.1359332. pp. 25-29.*

(Continued)

*Primary Examiner* — Kevin M Burd
(74) *Attorney, Agent, or Firm* — Paul S. Holdaway (57) ABSTRACT

A method of wireless communication is disclosed that includes receiving a plurality of samples from a transmission of a known sequence; identifying a peak position in the known sequence based on a correlation of the plurality of samples and the known sequence; and adjusting the identified peak position based on an offset. An apparatus for performing the method is also disclosed herein.

29 Claims, 8 Drawing Sheets

(56) References Cited

U.S. PATENT DOCUMENTS

| | | |
|---|---|---|
| 6,469,628 B1 | 10/2002 | Richards et al. |
| 6,483,461 B1 | 11/2002 | Matheney et al. |
| 6,489,893 B1 | 12/2002 | Richards et al. |
| 6,492,904 B2 | 12/2002 | Richards |
| 6,492,906 B1 | 12/2002 | Richards et al. |
| 6,501,393 B1 | 12/2002 | Richards et al. |
| 6,504,483 B1 | 1/2003 | Richards et al. |
| 6,512,455 B2 | 1/2003 | Finn et al. |
| 6,512,488 B2 | 1/2003 | Schantz |
| 6,519,464 B1 | 2/2003 | Santhoff et al. |
| 6,529,568 B1 | 3/2003 | Richards et al. |
| 6,538,615 B1 | 3/2003 | Schantz |
| 6,539,213 B1 | 3/2003 | Richards et al. |
| 6,549,567 B1 | 4/2003 | Fullerton |
| 6,552,677 B2 | 4/2003 | Barnes et al. |
| 6,556,621 B1 | 4/2003 | Richards et al. |
| 6,560,463 B1 | 5/2003 | Santhoff |
| 6,571,089 B1 | 5/2003 | Richards et al. |
| 6,573,857 B2 | 6/2003 | Fullerton et al. |
| 6,577,691 B2 | 6/2003 | Richards et al. |
| 6,585,597 B2 | 7/2003 | Finn |
| 6,593,886 B2 | 7/2003 | Schantz |
| 6,606,051 B1 | 8/2003 | Fullerton et al. |
| 6,611,234 B2 | 8/2003 | Fullerton et al. |
| 6,614,384 B2 | 9/2003 | Hall et al. |
| 6,621,462 B2 | 9/2003 | Barnes |
| 6,636,566 B1 | 10/2003 | Roberts et al. |
| 6,636,567 B1 | 10/2003 | Roberts et al. |
| 6,636,573 B2 | 10/2003 | Richards et al. |
| 6,642,903 B2 | 11/2003 | Schantz |
| 6,661,342 B2 | 12/2003 | Hall et al. |
| 6,667,724 B2 | 12/2003 | Barnes et al. |
| 6,670,909 B2 | 12/2003 | Kim |
| 6,671,310 B1 | 12/2003 | Richards et al. |
| 6,674,396 B2 | 1/2004 | Richards et al. |
| 6,677,796 B2 | 1/2004 | Brethour et al. |
| 6,700,538 B1 | 3/2004 | Richards |
| 6,710,736 B2 | 3/2004 | Fullerton et al. |
| 6,717,992 B2 | 4/2004 | Cowie et al. |
| 6,748,040 B1 | 6/2004 | Johnson et al. |
| 6,750,757 B1 | 6/2004 | Gabig, Jr. et al. |
| 6,759,948 B2 | 7/2004 | Grisham et al. |
| 6,760,387 B2 | 7/2004 | Langford et al. |
| 6,762,712 B2 | 7/2004 | Kim |
| 6,763,057 B1 | 7/2004 | Fullerton et al. |
| 6,763,282 B2 | 7/2004 | Glenn et al. |
| 6,774,846 B2 | 8/2004 | Fullerton et al. |
| 6,774,859 B2 | 8/2004 | Schantz et al. |
| 6,778,603 B1 | 8/2004 | Fullerton et al. |
| 6,781,530 B2 | 8/2004 | Moore |
| 6,782,048 B2 | 8/2004 | Santhoff |
| 6,788,730 B1 | 9/2004 | Richards et al. |
| 6,822,604 B2 | 11/2004 | Hall et al. |
| 6,823,022 B1 | 11/2004 | Fullerton et al. |
| 6,836,223 B2 | 12/2004 | Moore |
| 6,836,226 B2 | 12/2004 | Moore |
| 6,845,253 B1 | 1/2005 | Schantz |
| 6,847,675 B2 | 1/2005 | Fullerton et al. |
| 6,879,878 B2 | 4/2005 | Glenn et al. |
| 6,882,301 B2 | 4/2005 | Fullerton |
| 6,895,034 B2 | 5/2005 | Nunally et al. |
| 6,900,732 B2 | 5/2005 | Richards |
| 6,906,625 B1 | 6/2005 | Taylor et al. |
| 6,907,244 B2 | 6/2005 | Santhoff et al. |
| 6,912,240 B2 | 6/2005 | Kumar et al. |
| 6,914,949 B2 | 7/2005 | Richards et al. |
| 6,917,284 B2 | 7/2005 | Grisham et al. |
| 6,919,838 B2 | 7/2005 | Santhoff |
| 6,922,166 B2 | 7/2005 | Richards et al. |
| 6,922,177 B2 | 7/2005 | Barnes et al. |
| 6,925,109 B2 | 8/2005 | Richards et al. |
| 6,933,882 B2 | 8/2005 | Fullerton |
| 6,937,639 B2 | 8/2005 | Pendergrass et al. |
| 6,937,663 B2 | 8/2005 | Jett et al. |
| 6,937,667 B1 | 8/2005 | Fullerton et al. |
| 6,937,674 B2 | 8/2005 | Santhoff et al. |
| 6,947,492 B2 | 9/2005 | Santhoff et al. |
| 6,950,485 B2 | 9/2005 | Richards et al. |
| 6,954,480 B2 | 10/2005 | Richards et al. |
| 6,959,031 B2 | 10/2005 | Haynes et al. |
| 6,959,032 B1 | 10/2005 | Richards et al. |
| 6,963,727 B2 | 11/2005 | Shreve |
| 6,980,613 B2 | 12/2005 | Krivokapic |
| 6,989,751 B2 | 1/2006 | Richards |
| 7,015,793 B2 | 3/2006 | Gabig, Jr. et al. |
| 7,020,224 B2 | 3/2006 | Krivokapic |
| 7,027,425 B1 | 4/2006 | Fullerton et al. |
| 7,027,483 B2 | 4/2006 | Santhoff et al. |
| 7,027,493 B2 | 4/2006 | Richards |
| 7,030,806 B2 | 4/2006 | Fullerton |
| 7,042,417 B2 | 5/2006 | Santhoff et al. |
| 7,046,187 B2 | 5/2006 | Fullerton et al. |
| 7,046,618 B2 | 5/2006 | Santhoff et al. |
| 7,069,111 B2 | 6/2006 | Glenn et al. |
| 7,075,476 B2 | 7/2006 | Kim |
| 7,079,827 B2 | 7/2006 | Richards et al. |
| 7,099,367 B2 | 8/2006 | Richards et al. |
| 7,099,368 B2 | 8/2006 | Santhoff et al. |
| 7,129,886 B2 | 10/2006 | Hall et al. |
| 7,132,975 B2 | 11/2006 | Fullerton et al. |
| 7,145,954 B1 | 12/2006 | Pendergrass et al. |
| 7,148,791 B2 | 12/2006 | Grisham et al. |
| 7,151,490 B2 | 12/2006 | Richards |
| 7,167,525 B2 | 1/2007 | Santhoff et al. |
| 7,170,408 B2 | 1/2007 | Taylor et al. |
| 7,184,938 B1 | 2/2007 | Lansford et al. |
| 7,190,722 B2 | 3/2007 | Lakkis et al. |
| 7,190,729 B2 | 3/2007 | Siwiak |
| 7,206,334 B2 | 4/2007 | Siwiak |
| 7,209,724 B2 | 4/2007 | Richards et al. |
| 7,230,980 B2 | 6/2007 | Langford et al. |
| 7,239,277 B2 | 7/2007 | Fullerton et al. |
| RE39,759 E | 8/2007 | Fullerton |
| 7,256,727 B2 | 8/2007 | Fullerton et al. |
| 7,271,779 B2 | 9/2007 | Hertel |
| 2004/0100376 A1* | 5/2004 | Lye et al. ................. 340/539.12 |
| 2005/0042999 A1* | 2/2005 | Rappaport .................... 455/307 |
| 2005/0141553 A1* | 6/2005 | Kim et al. .................... 370/466 |
| 2008/0170645 A1* | 7/2008 | Kleider et al. ................ 375/343 |

OTHER PUBLICATIONS

Daxian Yun et al: "Tracking Loop for IR-UWB communications in IEEE 802.15 Multi-path Channels" Circuits and Systems, 2008. ISCAS 2008. IEEE international Symposium ON, IEEE, Piscataway, NJ. LNKD-DOI: 10.1109/ISCAS.2008.4541961, May 18, 2008, pp. 2490-2493.*

Daxian Yun, et al., "Tracking loop for IR-UWB communications in IEEE 802.15 multi-path channels" Circuits and Systems, 2008. ISCAS 2008. IEEE International Symposium ON, IEEE, Piscataway, NJ, USA LNKD- DOI: 10.1109/ISCAS.2008.4541961, May 18, 2008 (May 1, 2008.

International Search Report and Written Opinion—PCT/US2010/ 033667, International Search Authority—European Patent Office— Jul. 6, 2010.

Yuanjin Zhang, et al., "A new synchronization algorithm for UWB impulse radio communication systems" Communications Systems, 2004. ICCS 2004. The Ninth International Conference on Singapore, China Sep. 6-8, 2004, Piscataway, NJ, USAJEEE LNKD- DOI: 10.1109/.

* cited by examiner

METHOD AND APPARATUS FOR CLOCK DRIFT COMPENSATION DURING ACQUISITION IN A WIRELESS COMMUNICATION SYSTEM

BACKGROUND

I. Field

The following description relates generally to communication systems, and more particularly, to a method and apparatus for clock drift compensation during acquisition in a wireless communication system.

II. Background

In order for a wireless device to receive a transmission, which includes a plurality of packets, the receiver of the wireless device must perform an acquisition operation to acquire the received signal. Each packet begins with a preamble, which generally includes a known sequence. The acquisition process includes packet detection, symbol timing estimation, carrier frequency offset estimation and carrier phase estimation by means of the preamble so that the information following in the rest of the packet can be correctly demodulated.

Prior to the reception and data demodulation of a packet that is transmitted using a waveform; the receiver needs to determine where the beginning of the packet occurs in the waveform. The acquisition process usually consists of at least two steps, with the first step being sampling the waveform to determine where in the packet the receiver has started receiving the waveform, and the second step is performing hypothesis testing. The hypothesis testing refers to the computation of the correlation between the known sequence and the demodulated sequences starting at various positions. The signal is considered to be acquired when the largest correlation value is larger than a pre-defined threshold. The starting position of the hypothesis is the time base on where all the remaining operations are based. Typically, a tracking process follows the acquisition to further refine the timing, but the time base needs to be acquired with relative accuracy.

During the period of time needed for the acquisition process to complete, clock drift may occur between the transmitter and the receiver. Had there been no clock drift between the transmitter and receiver, the time base obtained at acquisition stage could be used for tracking and other operations without error. Even when clock drift exists, it is not a significant problem in most existing communication systems. This is due to either highly accurate oscillators (CDMA2000 EV-DO requires clock drift within ±0.5 parts per million (ppm)), and/or narrow signal bandwidth (IEEE 802.11a signal uses 20 MHz bandwidth, the clock drift is required to be within ±20 ppm). However, the oscillators found in low-cost devices are usually not very accurate. For example, if the transmitter and receiver use oscillators that drift in the range of ±100 ppm, which equals a maximum of 200 ppm between the transmitting and receiving devices. Thus, if a sampling phase completes in 12.8 microseconds (µs) and a computation phase completes in 10 µs. In the worst case, the clock has drifted 4.6 nanoseconds (ns) by the time the receiver finishes the acquisition process. The time base thus derived may thus be off by as large as 3 ns even if error that is due to noise is ignored. The factors that cause degradation of acquisition performance include noise, interference, and clock drift between the two ends of the communication channel. For low-cost pulse-based ultra-wideband devices, clock drift can be extremely detrimental. For example, a 2-ns offset can sometime cause the receiver to lose most of the pulses and lead to acquisition failure. In a pulse-based ultra-wideband (UWB) system, this could be a significant portion of the pulse. Without proper compensation for the drift, the completion of the acquisition is likely to fail.

Consequently, it would be desirable to address one or more of the deficiencies described above.

SUMMARY

According to various aspects, the subject innovation relates to systems and/or methods for wireless communications to provide clock drift compensation during acquisition.

According to another aspect of the disclosure, a method of wireless communications is provided. The method includes receiving a plurality of samples from a transmission of a known sequence; identifying a peak position in the known sequence based on a correlation of the plurality of samples and the known sequence; and adjusting the identified peak position based on an offset.

According to yet another aspect of the disclosure, an apparatus for wireless communications is provided. The apparatus includes means for receiving a plurality of samples from a transmission of a known sequence; means for identifying a peak position in the known sequence based on a correlation of the plurality of samples and the known sequence; and means for adjusting the identified peak position based on an offset.

According to yet another aspect of the disclosure, an apparatus for wireless communications is provided. The apparatus includes a receiver configured to receive a plurality of samples from a transmission of a known sequence; and, a processing system. The processing system is configured to identify a peak position in the known sequence based on a correlation of the plurality of samples and the known sequence; and, adjust the identified peak position based on an offset.

According to yet another aspect of the disclosure, a computer-program product for wireless communications is disclosed. The computer-program product includes a machine-readable medium comprising instructions executable by a processor to cause the processor to receive a plurality of samples from a transmission of a known sequence; identify a peak position in the known sequence based on a correlation of the plurality of samples and the known sequence; and, adjusting the identified peak position based on an offset.

According to yet another aspect of the disclosure, a wireless communication device is disclosed. The wireless communication device includes a wireless network adapter configured to receive a plurality of samples from a transmission of a known sequence; and a processing system configured to identify a peak position in the known sequence based on a correlation of the plurality of samples and the known sequence; and adjusting the identified peak position based on an offset.

According to yet a further aspect of the disclosure, a headset is disclosed. The headset includes a receiver configured to receive a plurality of samples from a transmission of a known sequence; a correlator configured to identify a peak position in the known sequence based on a correlation of the plurality of samples and the known sequence; an adjustor configured to adjust the identified peak position based on an offset; and a transducer configured to provide audio using the adjusted identified peak position.

According to yet a further aspect of the disclosure, a sensing device is disclosed. The sensing device includes a sensor configured to sense information; a receiver configured to receive a plurality of samples from a transmission of a known sequence; a correlator configured to identify a peak position in the known sequence based on a correlation of the plurality of samples and the known sequence; an adjustor configured to adjust the identified peak position based on an offset; and a transmitter configured to transmit a signal based on the sensed information using the adjusted identified peak position.

According to yet a further aspect of the disclosure, a handset is disclosed. The handset includes a transducer configured to detect an audio signal; a receiver configured to receive a plurality of samples from a transmission of a known sequence; a correlator configured to identify a peak position in the known sequence based on a correlation of the plurality of samples and the known sequence; an adjustor configured to adjust the identified peak position based on an offset; and a transmitter configured to transmit a signal based on the audio signal using the adjusted identified peak position.

According to yet a further aspect of the disclosure, a watch is disclosed. The watch includes a receiver configured to receive a plurality of samples from a transmission of a known sequence; a correlator configured to identify a peak position in the known sequence based on a correlation of the plurality of samples and the known sequence; an adjustor configured to adjust the identified peak position based on an offset; and a user interface configured to provide an indication using the adjusted identified peak position.

Although particular aspects are described herein, many variations and permutations of these aspects fall within the scope of the disclosure. Whereas some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following Detailed Description. The detailed description and drawings are merely illustrative of the disclosure rather than limiting, the scope of the disclosure being defined by the appended claims and equivalents thereof.

BRIEF DESCRIPTION OF THE DRAWINGS

These and other sample aspects of the disclosure will be described in the detailed description that follow, and in the accompanying drawings, wherein.

In accordance with common practice, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Figure 1:
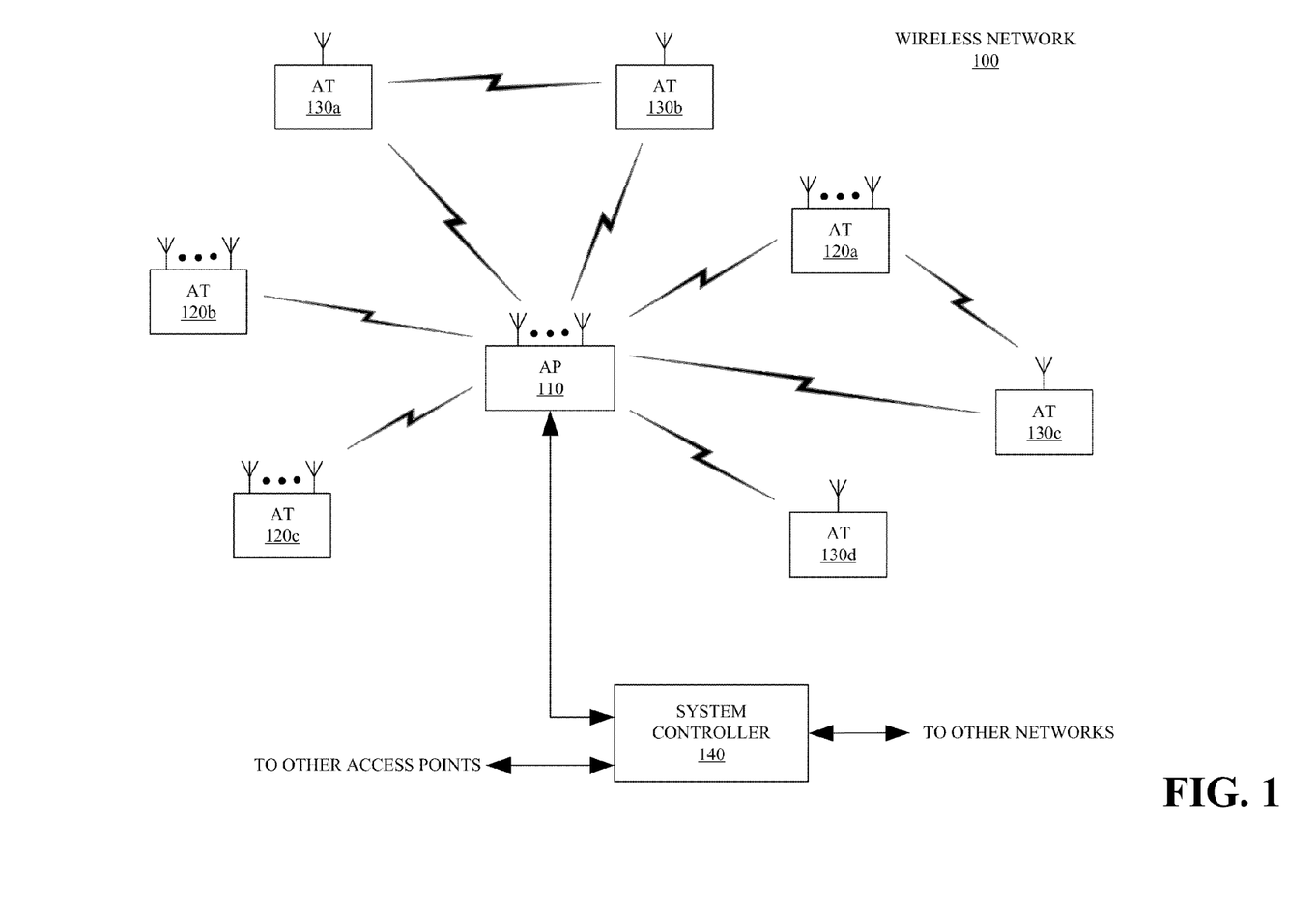
FIG. 1 is a diagram of a wireless communications network configured in accordance with an aspect of the disclosure.

Several aspects of a wireless network 100 that includes devices that implements an acquisition clock-drift compensation system will now be presented with reference to FIG. 1. The wireless network 100 is shown with several wireless nodes, generally designated as an access point 110, and a plurality of access terminals 120a-120c and 130a-130d. Each wireless node is capable of receiving and/or transmitting signals using radio frequency, with the access point 110 and the plurality of access terminals 120a-120c implementing some variation of MIMO technology while the plurality of access terminals 130a-130d implements only SISO technology. In the detailed description that follows, for downlink communications the term "access point" is used to designate a transmitting node and the term "access terminal" is used to designate a receiving node, whereas for uplink communications these terms are conversely used to refer to a receiving node and a transmitting node, respectively. However, those skilled in the art will readily understand that other terminology or nomenclature may be used for a base station and/or mobile station. By way of example, an access point may be referred to as a base station, a base transceiver station, a station, a terminal, a node, an access terminal acting as an access point, or some other suitable terminology. An access terminal may be referred to as a mobile station, a user equipment, a user terminal, a subscriber station, a station, a wireless device, an access point acting as an access terminal, a terminal, a node, or some other suitable terminology. The various concepts described throughout this disclosure are intended to apply to all suitable wireless nodes regardless of their specific nomenclature.

The wireless network 100 may support any number of access points distributed throughout a particular area to provide coverage for the plurality of access terminals 120a-120c and 130a-130d. A system controller 140 may be used to provide coordination and control of the access points, as well as access to other networks (e.g., Internet) for the access terminals 120a-120c and 130a-130d. For simplicity, one access point 110 is shown. An access point is generally a fixed terminal that provides network access to access terminals in the area of coverage. However, the access point may be mobile in some applications. An access terminal, which may be fixed or mobile, utilizes the network connectivity of an access point or engages in peer-to-peer communications with other access terminal. Examples of devices that may operate as an access terminal include telephones (e.g., cellular telephones), laptop computers, desktop computers, Personal Digital Assistants (PDAs), digital audio players (e.g., MP3 players), cameras, game consoles, or any other suitable devices having wireless communication capabilities.

The wireless network 100 may support any number of access points distributed throughout a particular area to provide coverage for the plurality of access terminals 120a-120c and 130a-130d. A system controller 140 may be used to provide coordination and control of the access points, as well as access to other networks (e.g., Internet) for the access terminals 120a-120c point 110 is shown. An access point is generally a fixed terminal that provides network access to access terminals in the area of coverage. However, the access point may be mobile in some applications. An access terminal, which may be fixed or mobile, utilizes the network connectivity of an access point or engages in peer-to-peer communications with other access terminal. Examples of devices that may operate as an access terminal include telephones (e.g., cellular telephones), laptop computers, desktop computers, Personal Digital Assistants (PDAs), digital audio players (e.g., MP3 players), cameras, game consoles, or any other suitable devices having wireless communication capabilities.

One or more access terminals 120 may be equipped with multiple antennas to enable certain functionality. With this configuration, multiple antennas at the access point 110 may be used to communicate with a multiple antenna access point to improve data throughput without additional bandwidth or transmit power. This may be achieved by splitting a high data rate signal at the transmitter into multiple lower rate data streams with different spatial signatures, thus enabling the receiver to separate these streams into multiple channels and properly combine the streams to recover the high rate data signal.

While portions of the following disclosure will describe access terminals that also support Multiple In, Multiple Out (MIMO) technology, the access point 110 may also be configured to support access terminals that do not support MIMO technology. This approach may allow older versions of access terminals (i.e., "legacy" terminals) to remain deployed in a wireless network, extending their useful lifetime, while allowing newer MIMO access terminals to be introduced as appropriate.

In the detailed description that follows, various aspects will be described with reference to a MIMO system supporting any suitable wireless technology, such as Orthogonal Frequency Division Multiplexing (OFDM). OFDM is a spread-spectrum technique that distributes data over a number of subcarriers spaced apart at precise frequencies. The spacing provides "orthogonality" that enables a receiver to recover the data from the subcarriers. An OFDM system may implement IEEE 802.11, or some other air interface standard. Other suitable wireless technologies include, by way of example, Code Division Multiple Access (CDMA), Time Division Multiple Access (TDMA), or any other suitable wireless technology, or any combination of suitable wireless technologies. A CDMA system may implement with IS-2000, IS-95, IS-856, Wideband-CDMA (WCDMA), or some other suitable air interface standard. A TDMA system may implement Global System for Mobile Communications (GSM) or some other suitable air interface standard. As those skilled in the art will readily appreciate, the various aspects of this disclosure are not limited in application to any particular wireless technology and/or air interface standard.

The wireless node, whether an access point or access terminal, may be implemented with a protocol that utilizes a layered structure that includes a physical (PHY) layer that implements all the physical and electrical specifications to interface the wireless node to the shared wireless channel, a MAC layer that coordinates access to the shared wireless channel, and an application layer that performs various data processing functions including, by way of example, speech and multimedia codecs and graphics processing. Additional protocol layers (e.g., network layer, transport layer) may be required for any particular application. In some configurations, the wireless node may act as a relay point between an access point and access terminal, or two access terminals, and therefore, may not require an application layer. Those skilled in the art will be readily able to implement the appropriate protocol for any wireless node depending on the particular application and the overall design constraints imposed on the overall system.

When the wireless node in a transmit mode, the application layer processes data, segments the data into packets, and provides the data packets to the MAC layer. The MAC layer assembles MAC packets with each data packet from the application layer being carried by the payload of a MAC packet. Alternatively, the payload for a MAC packet may carry a fragment of a data packet or multiple data packets from the application layer. Each MAC packet includes a MAC header and an error detection code. The MAC packet is sometimes referred to as a MAC Protocol Data Unit (MPDU), but may also be referred to as a frame, packet, timeslot, segment, or any other suitable nomenclature.

When the MAC decides to transmit, it provides a block of MAC packets to the PHY layer. The PHY layer assembles a PHY packet by assembling the block of MAC packets into a payload and adding a preamble. As will be discussed in greater detail later, the PHY layer is also responsible for providing various signal processing functions (e.g., modulating, coding, spatial processing, etc.). The preamble, which is sometimes referred to as Physical Layer Convergence Protocol (PLCP), is used by the receiving node to detect the start of the PHY packet and synchronize to the transmitter's node data clock. The PHY packet is sometimes referred to as a Physical Layer Protocol Data Unit (PLPDU), but may also be referred to as a frame, packet, timeslot, segment, or any other suitable nomenclature.

When the wireless node is in a receive mode, the process is reversed. That is, the PHY layer detects an incoming PHY packet from the wireless channel. The preamble allows the PHY layer to lock in on the PHY packet and perform various signal processing functions (e.g., demodulating, decoding, spatial processing, etc.). Once processed, the PHY layer recovers the block of MAC packets carried in the payload of the PHY packet and provides the MAC packets to the MAC layer.

Figure 2:
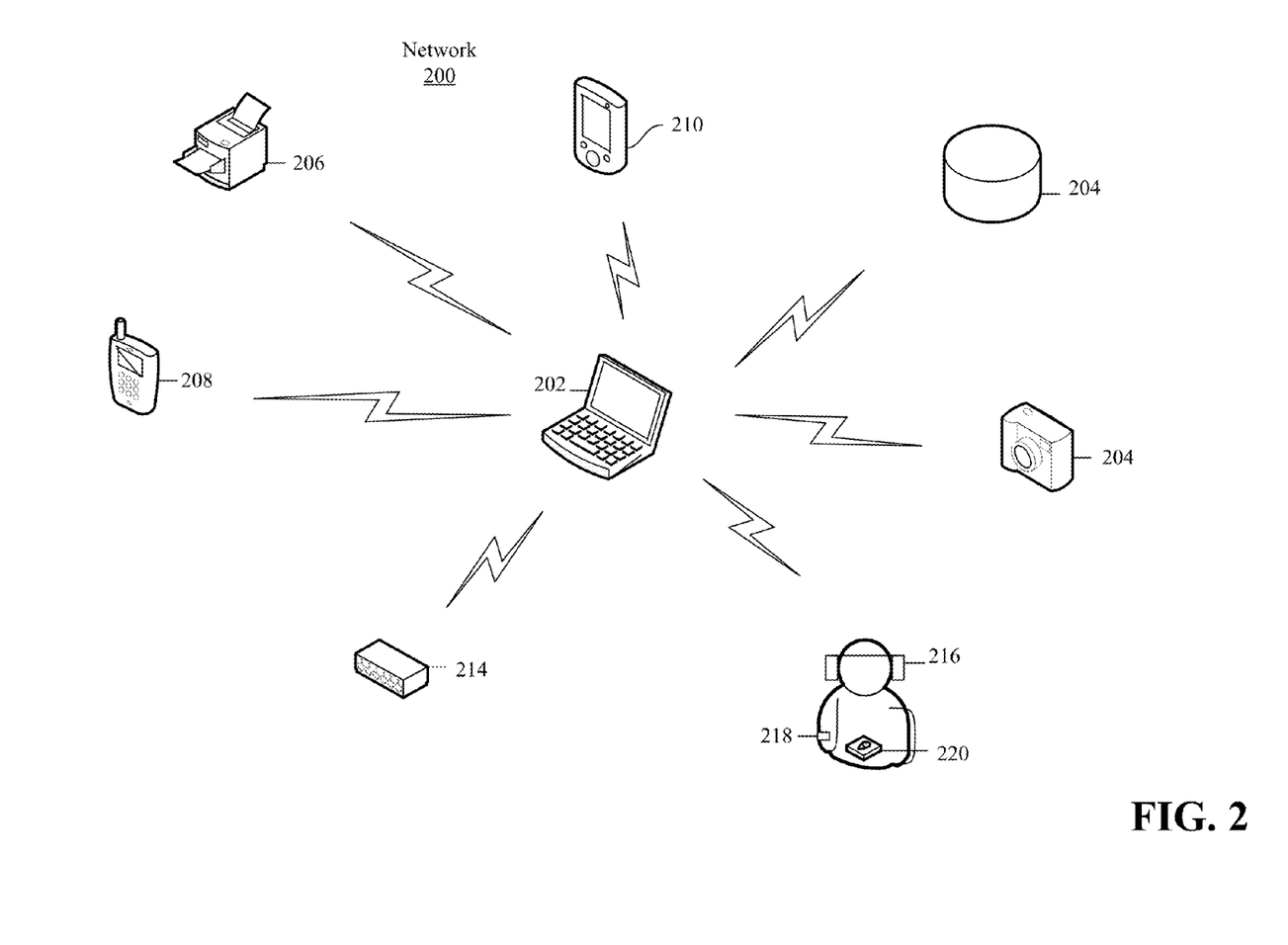
FIG. 2 is a diagram of a short range communications network configured in accordance with an aspect of the disclosure.

An example of a short range communications network suitable for supporting one or more aspects presented throughout this disclosure is illustrated in FIG. 2. The network 200 is shown with various wireless nodes that communicate using any suitable radio technology or wireless protocol. By way of example, the wireless nodes may be configured to support Ultra-Wideband (UWB) technology.

Alternatively, the wireless nodes may be configured to support various wireless protocols such as Bluetooth or IEEE 802.11, just to name a few.

The network 200 is shown with a computer 202 in communication with the other wireless nodes. In this example, the computer 202 may receive digital photos from a digital camera 204, send documents to a printer 206 for printing, synch-up with e-mail on a personal digital assistant (PDA) 208, transfer music files to a digital audio player (e.g., MP3 player) 210, back up data and files to a mobile storage device 212, and communicate with a remote network (e.g., the Internet) via a wireless hub 214. The network 200 may also include a number of mobile and compact nodes, either wearable or implanted into the human body. By way of example, a person may be wearing a headset 216 (e.g., headphones, earpiece, etc.) that receives streamed audio from the computer 202, a watch 218 that is set by the computer 202, and/or a sensor 220 which monitors vital body parameters (e.g., a biometric sensor, a heart rate monitor, a pedometer, and EKG device, etc.).

Although shown as a network supporting short range communications, aspects presented throughout this disclosure may also be configured to support communications in a wide area network supporting any suitable wireless protocol, including by way of example, Evolution-Data Optimized (EV-DO), Ultra Mobile Broadband (UMB), Code Division Multiple Access (CDMA) 2000, Long Term Evolution (LTE), or Wideband CDMA (W-CDMA), just to name a few. Alternatively, the wireless node may be configured to support wired communications using cable modem, Digital Subscriber Line (DSL), fiber optics, Ethernet, HomeRF, or any other suitable wired access protocol.

In some aspects a wireless device may communicate via an impulse-based wireless communication link. For example, an impulse-based wireless communication link may utilize ultra-wideband pulses that have a relatively short length (e.g., on the order of a few nanoseconds or less) and a relatively wide bandwidth. In some aspects the ultra-wideband pulses may have a fractional bandwidth on the order of approximately 20% or more and/or have a bandwidth on the order of approximately 500 MHz or more.

The teachings herein may be incorporated into (e.g., implemented within or performed by) a variety of apparatuses (e.g., devices). For example, one or more aspects taught herein may be incorporated into a phone (e.g., a cellular phone), a personal data assistant ("PDA"), an entertainment device (e.g., a music or video device), a headset (e.g., headphones, an earpiece, etc.), a microphone, a medical sensing device (e.g., a biometric sensor, a heart rate monitor, a pedometer, an EKG device, a smart bandage, etc.), a user I/O device (e.g., a watch, a remote control, a light switch, a keyboard, a mouse, etc.), an environment sensing device (e.g., a tire pressure monitor), a monitor that may receive data from the medical or environment sensing device, a computer, a point-of-sale device, an entertainment device, a hearing aid, a set-top box, or any other suitable device.

These devices may have different power and data requirements. In some aspects, the teachings herein may be adapted for use in low power applications (e.g., through the use of an impulse-based signaling scheme and low duty cycle modes) and may support a variety of data rates including relatively high data rates (e.g., through the use of high-bandwidth pulses).

Figure 3:
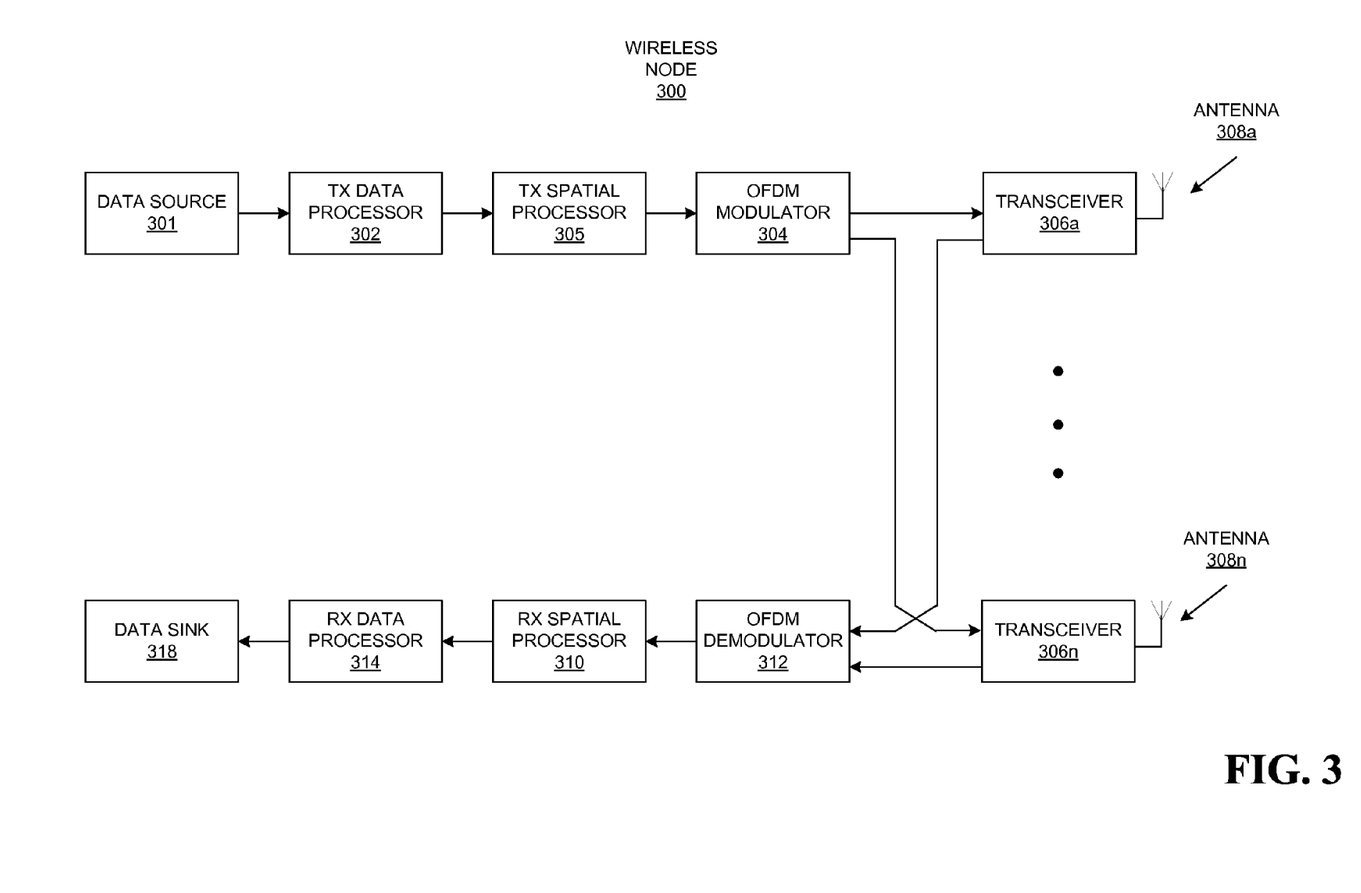
FIG. 3 is a block diagram of a Physical (PHY) layer of a wireless node in the wireless communications network of FIG. 1 that implements clock drift compensation in accordance with an aspect of the disclosure.

FIG. 3 is a conceptual block diagram illustrating an example of the signal processing functions of the PHY layer that implements clock drift compensation during acquisition. In a transmit mode, a TX data processor 302 may be used to receive data from the MAC layer of a data source 301 and encode (e.g., Turbo code) the data to facilitate Forward Error Correction (FEC) at the receiving node. The encoding process results in a sequence of code symbols that that may be blocked together and mapped to a signal constellation by the TX data processor 302 to produce a sequence of modulation symbols.

In wireless nodes implementing OFDM, the modulation symbols from the TX data processor 302 may be provided to a TX spatial processor 305 that provides spatial processing. This may be accomplished by spatially precoding each OFDM and then providing each spatially precoded stream to a different antenna 308a-308n via a respective transceiver 306a-306n. Each transceiver 306a-306n modulates an RF carrier with a respective precoded stream for transmission over the wireless channel. Usually, the spatial processing is done on frequency domain. Thus, the TX spatial processor 305 precedes the OFDM modulator.

The TX spatial processor 305 provides the results of the spatial processing to an OFDM modulator 304. The OFDM modulator 304 splits the modulation symbols into parallel streams. Each stream is then mapped to an OFDM subcarrier and then combined together using an Inverse Fast Fourier Transform (IFFT) to produce a time domain OFDM stream.

In a receive mode, each transceiver 306a-306n receives a signal through its respective antenna 308a-308n. Each transceiver 306a-306n may be used to recover the information modulated onto an RF carrier and provide the information to a RX spatial processor 310 once the information has been processed by an OFDM demodulator 312. In an aspect of the disclosure, each transceiver 306a-306n implements clock drift compensation during acquisition as described herein.

In wireless nodes implementing OFDM, the stream (or combined stream) from the received signals are provided to the OFDM demodulator 312. The OFDM demodulator 312 converts the stream (or combined stream) from time-domain to the frequency domain using a Fast Fourier Transform (FFT). The frequency domain signal comprises a separate stream for each subcarrier of the OFDM signal. The OFDM demodulator 312 recovers the data (i.e., modulation symbols) carried on each subcarrier and multiplexes the data into a stream of modulation symbols before providing it to the RX spatial processor 310.

The RX spatial processor 310 performs spatial processing on the information to recover any spatial streams destined for the wireless node 300. The spatial processing may be performed in accordance with Channel Correlation Matrix Inversion (CCMI), Minimum Mean Square Error (MMSE), Soft Interference Cancellation (SIC), or some other suitable technique. If multiple spatial streams are destined for the wireless node 300, they may be combined by the RX spatial processor 310.

A RX data processor 314 may be used to translate the modulation symbols back to the correct point in the signal constellation. Because of noise and other disturbances in the wireless channel, the modulation symbols may not correspond to an exact location of a point in the original signal constellation. The RX data processor 314 detects which modulation symbol was most likely transmitted by finding the smallest distance between the received point and the location of a valid symbol in the signal constellation. These soft decisions may be used, in the case of Turbo codes, for example, to compute a Log-Likelihood Ratio (LLR) of the code symbols associated with the given modulation symbols. The RX data processor 314 then uses the sequence of code symbol LLRs in order to decode the data that was originally transmitted before providing the data to the MAC layer in a data sink 318.

Figure 4:
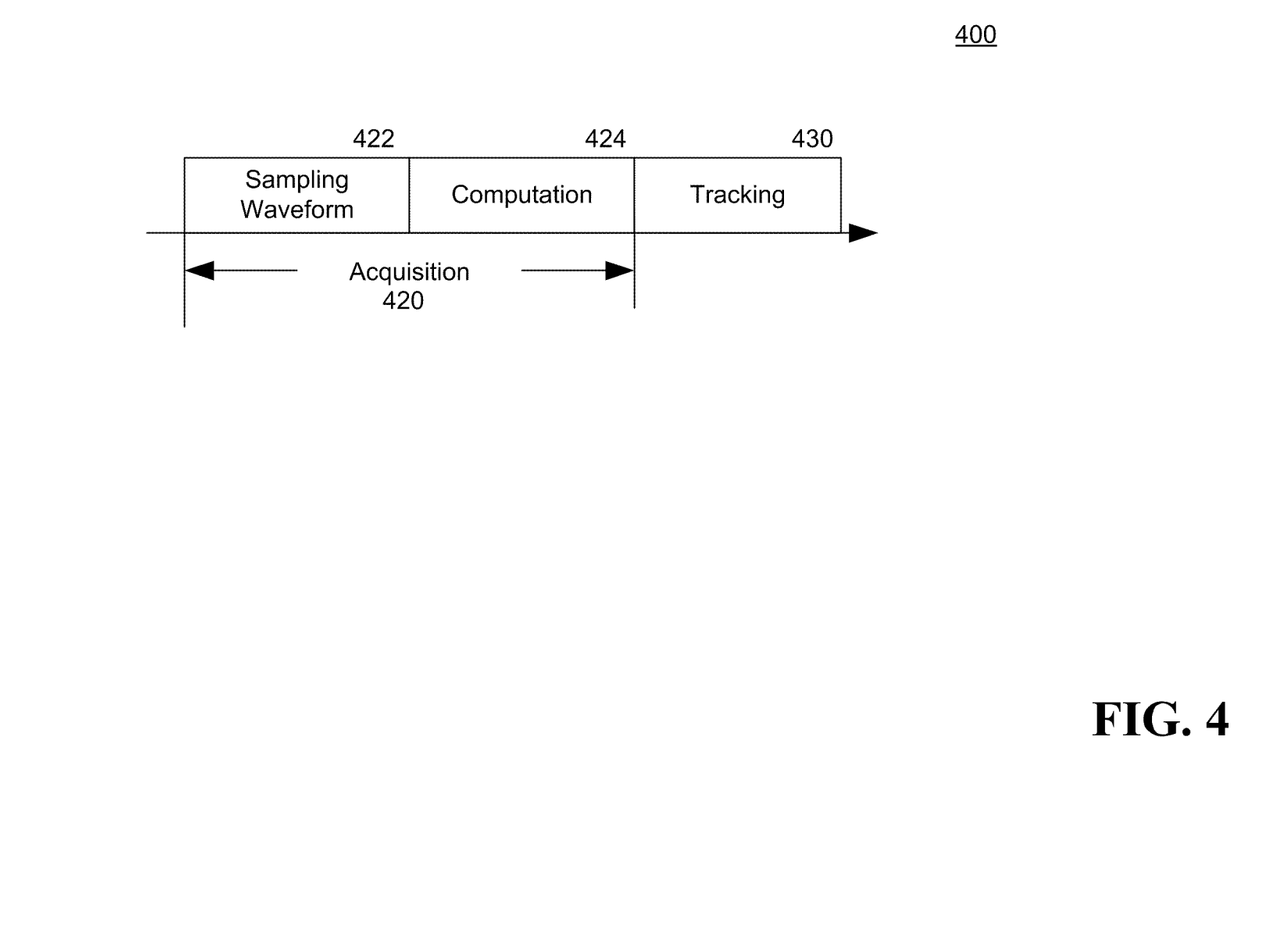
FIG. 4 is a timing diagram of a timing acquisition and tracking sequence of the wireless node of FIG. 3 in accordance with an aspect of the disclosure.

FIG. 4 illustrates a generalized timing acquisition and tracking sequence 400 including an acquisition operation 420 that includes a waveform sampling portion 422 and a computation portion 424; and a tracking operation 430. The acquisition operation 420 is an important step in wireless communications. Initially, a waveform is captured by the receiver of the wireless node during the waveform sampling portion 422. Then, the computation portion 424 tests a number of hypotheses by correlating received sequence at different offsets with a known sequence; the one that yields the maximum correlation and passes a pre-defined threshold is assumed to be the right hypothesis. Once the timing has been acquired, the tracking operation 430 is used to continue to track the signal. However, if clock drift occurs between the time the acquisition operation 420 is completed and the tracking operation 430 is started, then the tracking operation may fail.

Figure 5:
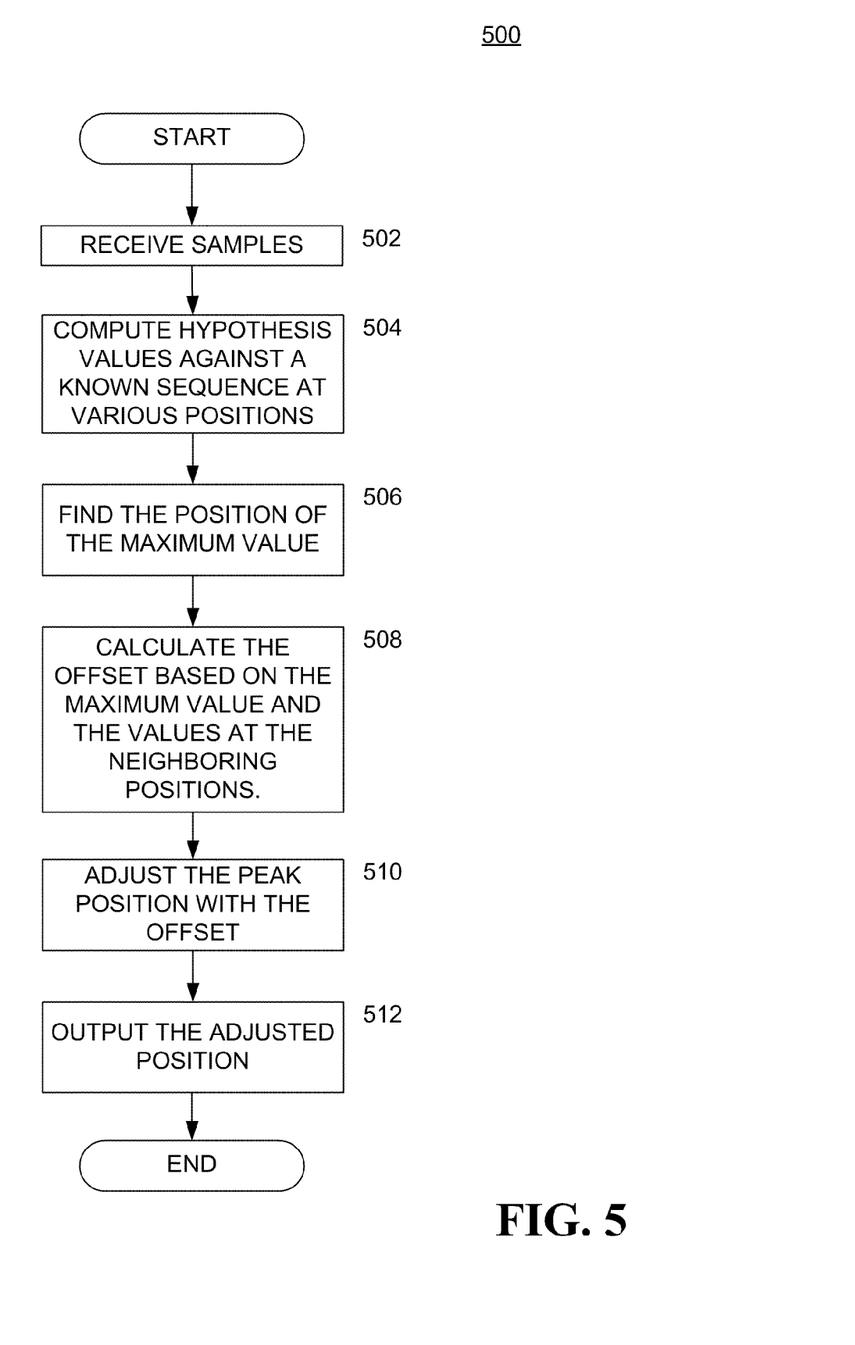
FIG. 5 is a flow diagram of a clock drift compensation during acquisition process of the wireless node of FIG. 3 in accordance with an aspect of the disclosure.

FIG. 5 illustrates a process 500 to compensate for clock drift during acquisition, thus reduce the probability of acquisition failure, where in step 502, a plurality of samples are received from a received waveform. In an aspect of the disclosure, the plurality of samples includes a plurality of measurements of the pulses that represent the received waveform. Then, in step 504, hypothesis values are computed for the known sequence as compared to a portion of the plurality of samples at various positions. By way of example, and not limitation, at least or as many as ten thousand samples may be used. In step 506, a position where the maximum value of the correlation operation is determined. This position is referred to as a peak position. In step 508, an offset to correct for the clock drift is calculated, as further detailed below, before the peak position is adjusted with the offset in step 510 to create an adjusted peak position. In step 512, the adjusted peak position is output. In an aspect of the disclosure, the peak position and adjusted peak position are index values.

Figure 6:
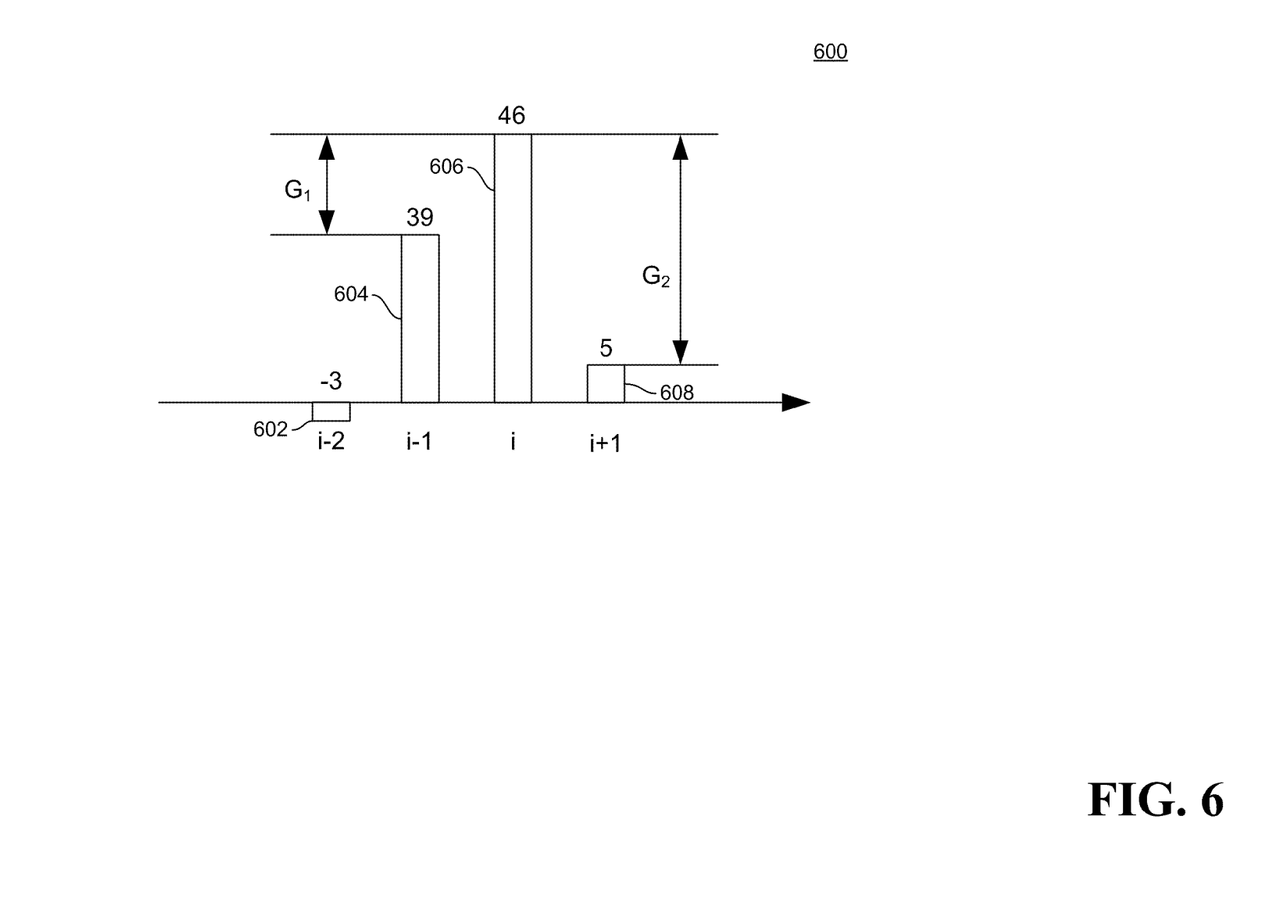
FIG. 6 is a chart illustrating results from the acquisition operation of the wireless node of FIG. 3 in accordance with an aspect of the disclosure.

FIG. 6 illustrates exemplary correlation values based on a correlation operation between the known sequence and the received signal. At index position i, with an associated time t, a peak correlation value 606 of 46 has been identified. The peak correlation value 606 is also referred to as the winning hypothesis. By examining the correlation values surrounding the winning hypothesis (i.e., the peak correlation value 606) and interpolating among these neighbors, the adverse effects from clock drift may be reduced. As illustrated in the figure, the wining hypothesis starts at position i and has a correlation of 46. In an aspect of the disclosure, the hypothesis step size is 4 samples. Without clock drift, position index i with the associated time t is the right starting time. However, with clock drift, the identified time position may drift in either direction as there is a mismatch between the identified position/time and the actual position/time. If there is a large enough drift, then the error may cause the tracking phase to fail. For example, if the cause drift causes the actual time to drift to somewhere near i+1, where a correlation value 608 that has been identified at 5 is very weak, then the tracking phase following may fail. However, as the correlation at a correlation value 604 is 39, the clock drift compensation approach provided in an aspect of the disclosure will place the starting position/time somewhere between i−1 and i. Thus, no matter which direction the clock drifts, the correlation is still relatively high, which facilitates a successful tracking operation.

In an aspect of the disclosure, a displacement or offset to be used to adjust the determined peak position and associated time base may be determined. In one approach, the starting point is always placed in the middle of two large hypotheses if some conditions are met. For example, referring again to FIG. 6, the starting point would be placed at i−1 if G1<10 and G2>30. Alternatively, the time base can be weighted by G1 and G2 through an interpolation process.

The operation of the clock drift compensation in creating an offset in a linear example may be provided as:

$$\text{offset} = \frac{G_1 - G_2}{K_{LINEAR}},$$

where $K_{LINEAR}$ is a normalization constant depending on the search resolution and the known sequence length. A non-linear example of the offset is given as:

$$\text{offset} = \frac{G_1^2 - G_2^2}{K_{NON\text{-}LINEAR}},$$

where $K_{NON\text{-}LINEAR}$ is a normalization constant depending on the search resolution and the known sequence length. In an aspect, the normalization constant $K_{LINEAR}$ in the linear example may be different from the normalization constant $K_{NON\text{-}LINEAR}$ in the non-linear example. In addition, calculations may involve values beyond the immediate neighboring positions.

Figure 7:
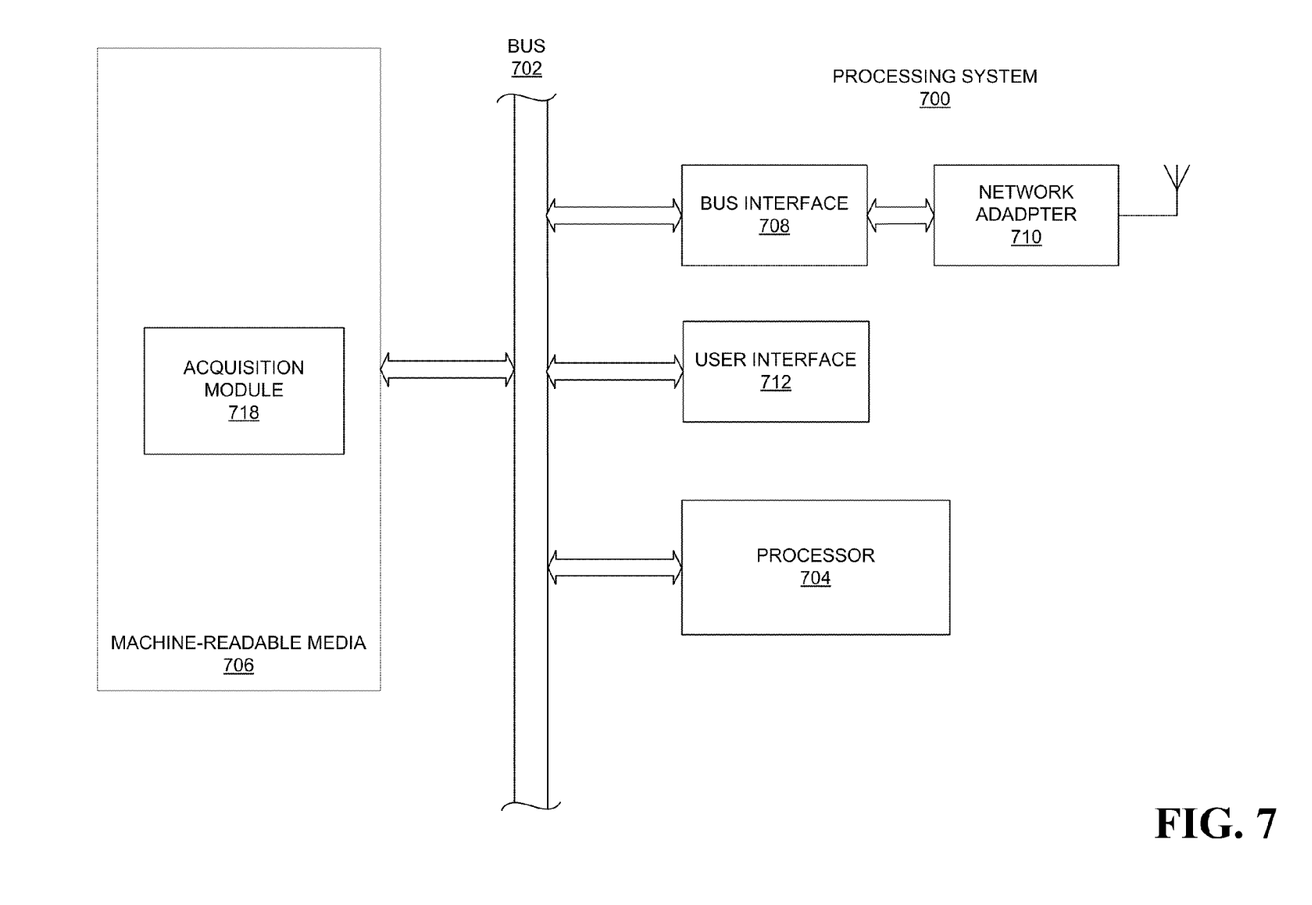
FIG. 7 is a block diagram illustrating an example of a hardware configuration for a processing system in a wireless node in the wireless communications network of FIG. 1; and, FIG. 8 is a block diagram of a communication apparatus configured in accordance with an aspect of the disclosure.

FIG. 7 is a conceptual diagram illustrating an example of a hardware configuration for a processing system in a wireless node. In this example, the processing system 700 may be implemented with a bus architecture represented generally by bus 702. The bus 702 may include any number of interconnecting buses and bridges depending on the specific application of the processing system 700 and the overall design constraints. The bus links together various circuits including a processor 704, machine-readable media 706, and a bus interface 708. The bus interface 708 may be used to connect a network adapter 710, among other things, to the processing system 700 via the bus 702. The network interface 710 may be used to implement the signal processing functions of the PHY layer. In the case of an access terminal 110 (see FIG. 1), a user interface 712 (e.g., keypad, display, mouse, joystick, etc.) may also be connected to the bus. The bus 702 may also link various other circuits such as timing sources, peripherals, voltage regulators, power management circuits, and the like, which are well known in the art, and therefore, will not be described any further.

The processor 704 is responsible for managing the bus and general processing, including the execution of software stored on the machine-readable media 708. The processor 708 may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable may be embodied in a computer-program product. The computer-program product may comprise packaging materials.

In the hardware implementation illustrated in FIG. 7, the machine-readable media 706 is shown as part of the processing system 700 separate from the processor 704. However, as those skilled in the art will readily appreciate, the machine-readable media 706, or any portion thereof, may be external to the processing system 700. By way of example, the machine-readable media 706 may include a transmission line, a carrier wave modulated by data, and/or a computer product separate from the wireless node, all which may be accessed by the processor 704 through the bus interface 708. Alternatively, or in addition to, the machine readable media 704, or any portion thereof, may be integrated into the processor 704, such as the case may be with cache and/or general register files.

The processing system 700 may be configured as a general-purpose processing system with one or more microprocessors providing the processor functionality and external memory providing at least a portion of the machine-readable media 706, all linked together with other supporting circuitry through an external bus architecture. Alternatively, the processing system 700 may be implemented with an ASIC (Application Specific Integrated Circuit) with the processor 704, the bus interface 708, the user interface 712 in the case of an access terminal), supporting circuitry (not shown), and at least a portion of the machine-readable media 706 integrated into a single chip, or with one or more FPGAs (Field Programmable Gate Array), PLDs (Programmable Logic Device), controllers, state machines, gated logic, discrete hardware components, or any other suitable circuitry, or any combination of circuits that can perform the various functionality described throughout this disclosure. Those skilled in the art will recognize how best to implement the described functionality for the processing system 700 depending on the particular application and the overall design constraints imposed on the overall system.

The machine-readable media 706 is shown with a number of software modules. The software modules include instructions that when executed by the processor 704 cause the processing system 700 to perform various functions. Each software module may reside in a single storage device or distributed across multiple storage devices. By way of example, a software module may be loaded into RAM from a hard drive when a triggering event occurs. During execution of the software module, the processor 704 may load some of the instructions into cache to increase access speed. One or more cache lines may then be loaded into a general register file for execution by the processor 704. When referring to the functionality of a software module below, it will be understood that such functionality is implemented by the processor 704 when executing instructions from that software module.

Figure 8:
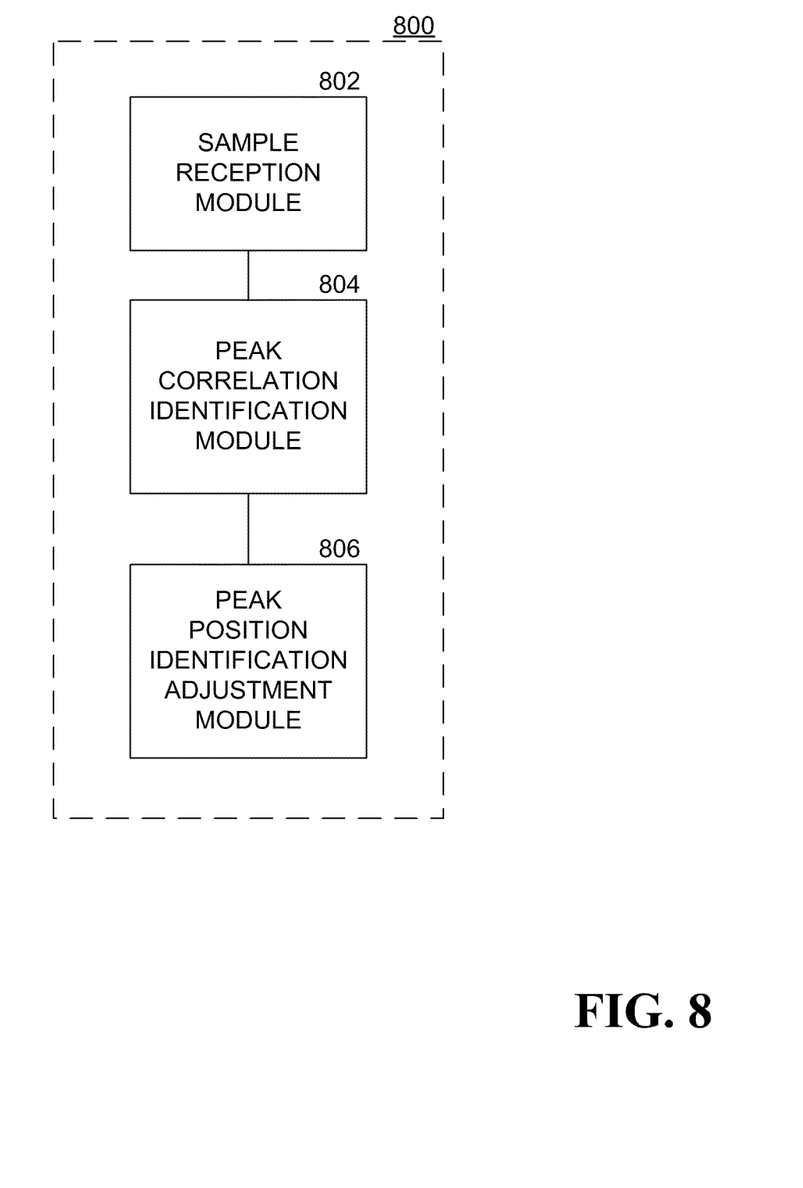

FIG. 8 is a block diagram illustrating an example of the functionality of an apparatus for communication 800 according to another aspect of the disclosure. The apparatus for communication 800 includes a sample reception module 802 for receiving a plurality of samples from a transmission of a known sequence; a peak correlation identification module 804 for identifying a peak position in the known sequence based on a correlation of the plurality of samples and the known sequence; and a peak position identification adjustment module 806 for adjusting the identified peak position based on an offset.

Various aspects described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media may include, but are not limited to, magnetic storage devices, optical disks, digital versatile disk, smart cards, and flash memory devices.

The disclosure is not intended to be limited to the preferred aspects. Furthermore, those skilled in the art should recognize that the method and apparatus aspects described herein may be implemented in a variety of ways, including implementations in hardware, software, firmware, or various combinations thereof. Examples of such hardware may include ASICs, Field Programmable Gate Arrays, general-purpose processors, DSPs, and/or other circuitry. Software and/or firmware implementations of the disclosure may be implemented via any combination of programming languages, including Java, C, C++, Matlab™, Verilog, VHDL, and/or processor specific machine and assembly languages.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The method and system aspects described herein merely illustrate particular aspects of the disclosure. It should be appreciated that those skilled in the art will be able to devise various arrangements, which, although not explicitly described or shown herein, embody the principles of the disclosure and are included within its scope. Furthermore, all examples and conditional language recited herein are intended to be only for pedagogical purposes to aid the reader in understanding the principles of the disclosure. This disclosure and its associated references are to be construed as being without limitation to such specifically recited examples and conditions. Moreover, all statements herein reciting principles, aspects, and aspects of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be appreciated by those skilled in the art that the block diagrams herein represent conceptual views of illustrative circuitry, algorithms, and functional steps embodying principles of the disclosure. Similarly, it should be appreciated that any flow charts, flow diagrams, signal diagrams, system diagrams, codes, and the like represent various processes that may be substantially represented in computer-readable medium and so executed by a computer or processor, whether or not such computer or processor is explicitly shown.

It is understood that any specific order or hierarchy of steps described in the context of a software module is being presented to provide an examples of a wireless node. Based upon design preferences, it is understood that the specific order or hierarchy of steps may be rearranged while remaining within the scope of the disclosure.

Although various aspects of the disclosure have been described as software implementations, those skilled in the art will readily appreciate that the various software modules presented throughout this disclosure may be implemented in hardware, or any combination of software and hardware. Whether these aspects are implemented in hardware or software depends upon the particular application and design constraints imposed on the overall system. Skilled artisans may implement the described functionality in varying ways for each particular application, but such implementation decisions should not be interpreted as causing a departure from the scope of the disclosure.

The previous description is provided to enable any person skilled in the art to understand fully the full scope of the disclosure. Modifications to the various configurations disclosed herein will be readily apparent to those skilled in the art. Thus, the claims are not intended to be limited to the various aspects of the disclosure described herein, but is to be accorded the full scope consistent with the language of claims, wherein reference to an element in the singular is not intended to mean "one and only one" unless specifically so stated, but rather "one or more." Further, the phrase "at least one of a, b and c" as used in the claims should be interpreted as a claim directed towards a, b or c, or any combination thereof Unless specifically stated otherwise, the terms "some" or "at least one" refer to one or more elements. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for wireless communication comprising:
   receiving a plurality of samples from a transmission of a known sequence for an acquisition of synchronization with a wireless node using the known sequence;
   identifying a peak position in the known sequence based on a correlation of the plurality of samples and the known sequence; and
   adjusting the identified peak position based on an offset before attempting to track the known sequence to maintain synchronization with the wireless node, wherein the offset is based on a function of correlation values of positions neighboring the peak position as adjusted to compensate for a timing drift.

2. The method of claim 1, further comprising generating a timing signal based on the adjusted peak position.

3. The method of claim 1, wherein the plurality of samples comprise a sampling of a waveform at multiple time periods.

4. The method of claim 3, wherein the waveform comprises a plurality of pulses, and the sample comprises a pulse in the plurality of pulses.

5. The method of claim 1, wherein the adjustment comprises shifting the peak position by a defined amount using the offset.

6. The method of claim 1, wherein the offset is at least one of a position index and a time.

7. The method of claim 1, wherein the function comprises a linear interpolation operation.

8. The method of claim 1, wherein the function comprises a non-linear interpolation operation.

9. An apparatus for wireless communication comprising:
   means for receiving a plurality of samples from a transmission of a known sequence for an acquisition of synchronization with a wireless node using the known sequence;
   means for identifying a peak position in the known sequence based on a correlation of the plurality of samples and the known sequence; and
   means for adjusting the identified peak position based on an offset before attempting to track the known sequence to maintain synchronization with the wireless node, wherein the offset is based on a function of correlation values of positions neighboring the peak position as adjusted to compensate for a timing drift.

10. The apparatus of claim 9, further comprising means for generating a timing signal based on the adjusted peak position.

11. The apparatus of claim 9, wherein the plurality of samples comprises a sampling of a waveform at multiple time periods.

12. The apparatus of claim 11, wherein the waveform comprises a plurality of pulses, and the sample comprises a pulse in the plurality of pulses.

13. The apparatus of claim 9, wherein the adjustment means comprises means for shifting the peak position by a defined amount using the offset.

14. The apparatus of claim 9, wherein the offset is at least one of a position index and a time.

15. The apparatus of claim 9, wherein the function comprises a linear interpolation operation.

16. The apparatus of claim 9, wherein the function comprises a non-linear interpolation operation.

17. An apparatus for wireless communication, comprising:
   a receiver configured to receive a plurality of samples from a transmission of a known sequence for an acquisition of synchronization with a wireless node using the known sequence; and,
   a processing system configured to:
      identify a peak position in the known sequence based on a correlation of the plurality of samples and the known sequence; and
      adjust the identified peak position based on an offset before attempting to track the known sequence to maintain synchronization with the wireless node, wherein the offset is based on a function of correlation values of positions neighboring the peak position as adjusted to compensate for a timing drift.

18. The apparatus of claim 17, wherein the processing system is further configured to generate a timing signal based on the adjusted peak position.

19. The apparatus of claim 17, wherein the plurality of samples comprises a sampling of a waveform at multiple time periods.

20. The apparatus of claim 19, wherein the waveform comprises a plurality of pulses, and the sample comprises a pulse in the plurality of pulses.

21. The apparatus of claim 17, wherein the processing system is further configured to shift the peak position by a defined amount using the offset.

22. The apparatus of claim 17, wherein the offset is at least one of a position index and a time.

23. The apparatus of claim 17, wherein the function comprises a linear interpolation operation.

24. The apparatus of claim 17, wherein the function comprises a non-linear interpolation operation.

25. A computer-program product for communication, comprising:
a non-transitory machine-readable medium comprising instructions executable by a processor to cause the processor to:
receive a plurality of samples from a transmission of a known sequence for an acquisition of synchronization with a wireless node using the known sequence;
identify a peak position in the known sequence based on a correlation of the plurality of samples and the known sequence; and
adjust the identified peak position based on an offset before attempting to track the known sequence to maintain synchronization with the wireless node, wherein the offset is based on a function of correlation values of positions neighboring the peak position as adjusted to compensate for a timing drift.

26. A headset comprising:
a receiver configured to receive a plurality of samples from a transmission of a known sequence for an acquisition of synchronization with a wireless node using the known sequence;
a correlator configured to identify a peak position in the known sequence based on a correlation of the plurality of samples and the known sequence;
an adjustor configured to adjust the identified peak position based on an offset before attempting to track the known sequence to maintain synchronization with the wireless node, wherein the offset is based on a function of correlation values of positions neighboring the peak position as adjusted to compensate for a timing drift; and
a transducer configured to provide audio using the adjusted identified peak position.

27. A sensing device, comprising:
a sensor configured to sense a signal;
a receiver configured to receive a plurality of samples from a transmission of a known sequence for an acquisition of synchronization with a wireless node using the known sequence;
a correlator configured to identify a peak position in the known sequence based on a correlation of the plurality of samples and the known sequence;
an adjustor configured to adjust the identified peak position based on an offset before attempting to track the known sequence to maintain synchronization with the wireless node, wherein the offset is based on a function of correlation values of positions neighboring the peak position as adjusted to compensate for a timing drift; and
a transmitter configured to transmit a signal based on the sensed signal using the adjusted identified peak position.

28. A handset, comprising:
a transducer configured to detect an audio signal;
a receiver configured to receive a plurality of samples from a transmission of a known sequence for an acquisition of synchronization with a wireless node using the known sequence;
a correlator configured to identify a peak position in the known sequence based on a correlation of the plurality of samples and the known sequence;
an adjustor configured to adjust the identified peak position based on an offset before attempting to track the known sequence to maintain synchronization with the wireless node, wherein the offset is based on a function of correlation values of positions neighboring the peak position as adjusted to compensate for a timing drift; and
a transmitter configured to transmit a signal based on the audio signal using the adjusted identified peak position.

29. A watch, comprising:
a receiver configured to receive a plurality of samples from a transmission of a known sequence for an acquisition of synchronization with a wireless node using the known sequence;
a correlator configured to identify a peak position in the known sequence based on a correlation of the plurality of samples and the known sequence;
an adjustor configured to adjust the identified peak position based on an offset before attempting to track the known sequence to maintain synchronization with the wireless node, wherein the offset is based on a function of correlation values of positions neighboring the peak position as adjusted to compensate for a timing drift; and
a user interface configured to provide an indication using the adjusted identified peak position.

* * * * *